(12) United States Patent
Gregerson et al.

(10) Patent No.: US 10,286,349 B2
(45) Date of Patent: May 14, 2019

(54) AIR FILTER USE INDICATORS

(71) Applicant: 3M INNOVATIVE PROPERTIES COMPANY, St. Paul, MN (US)

(72) Inventors: Glen O. Gregerson, Hudson, WI (US); Andrew R. Fox, Oakdale, MN (US); Nicolas A. Echeverri, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 302 days.

(21) Appl. No.: 15/137,548

(22) Filed: Apr. 25, 2016

(65) Prior Publication Data

US 2017/0128873 A1 May 11, 2017

Related U.S. Application Data

(60) Provisional application No. 62/253,221, filed on Nov. 10, 2015.

(51) Int. Cl.
*B01D 46/00* (2006.01)
*F24F 11/30* (2018.01)
*F24F 11/39* (2018.01)

(52) U.S. Cl.
CPC ......... *B01D 46/0086* (2013.01); *F24F 11/30* (2018.01); *F24F 11/39* (2018.01)

(58) Field of Classification Search
CPC ........ B01D 46/0086; F24F 11/30; F24F 11/39
USPC .................. 96/26, 421, 414, 417; 55/490
See application file for complete search history.

(56) References Cited

U.S. PATENT DOCUMENTS

| | | | |
|---|---|---|---|
| 2,753,831 A | 7/1956 | Davies | |
| 2,782,747 A | 2/1957 | Alderfer | |
| 2,804,839 A | 9/1957 | Hallinan | |
| 2,849,005 A | 8/1958 | Tucker | |
| 3,027,865 A | 4/1962 | Kautz | |
| 3,635,001 A | 1/1972 | Komroff | |
| 3,698,871 A | 10/1972 | Brennan | |
| 3,916,817 A | 11/1975 | Kemp | |
| 4,130,487 A | 12/1978 | Hunter | |
| RE30,782 E | 10/1981 | Van Turnhout | |
| 4,321,070 A | 3/1982 | Bede | |
| 4,336,038 A | 6/1982 | Schultheiss | |
| 4,563,333 A * | 1/1986 | Frigon | A62B 23/04 422/122 |
| 4,588,537 A | 5/1986 | Klaase | |
| 4,955,995 A | 9/1990 | Pontius | |
| 5,230,800 A | 7/1993 | Nelson | |
| 5,273,690 A * | 12/1993 | McDowell | A61L 9/12 206/532 |
| 5,350,620 A * | 9/1994 | Sundet | B01D 39/1623 428/172 |
| 5,460,787 A * | 10/1995 | Colon | A61L 9/12 239/55 |
| 5,486,410 A | 1/1996 | Groeger | |

(Continued)

FOREIGN PATENT DOCUMENTS

DE 4413148 4/1995
GB 2311857 10/1997

(Continued)

*Primary Examiner* — Frank M Lawrence, Jr.
(74) *Attorney, Agent, or Firm* — Kenneth B. Wood

(57) ABSTRACT

The present disclosure relates generally to air filter use indicators capable of indicating the degree of use of an air filter.

21 Claims, 6 Drawing Sheets

(56) References Cited

U.S. PATENT DOCUMENTS

| | | | |
|---|---|---|---|
| 5,496,507 A | 3/1996 | Angadjivand | |
| 5,505,753 A * | 4/1996 | Heysek | B01D 46/0086 55/502 |
| 5,538,690 A | 7/1996 | Greer | |
| 5,597,645 A | 1/1997 | Pike | |
| 5,662,728 A | 9/1997 | Groeger | |
| 5,908,598 A | 6/1999 | Rousseau | |
| 5,909,598 A | 6/1999 | Kadohara | |
| 5,919,847 A | 7/1999 | Rousseau | |
| 5,968,635 A | 10/1999 | Rousseau | |
| 5,972,808 A | 10/1999 | Groeger | |
| 5,976,208 A | 11/1999 | Rousseau | |
| 5,976,467 A | 11/1999 | Dallas | |
| 6,057,256 A | 5/2000 | Krueger | |
| 6,110,260 A | 8/2000 | Kubokawa | |
| 6,117,218 A * | 9/2000 | Snyder | A61L 9/048 261/DIG. 17 |
| 6,123,906 A * | 9/2000 | Farmer | A61L 9/12 239/36 |
| 6,187,596 B1 | 2/2001 | Dallas | |
| 6,200,465 B1 * | 3/2001 | Carawan | B01D 46/008 210/238 |
| 6,268,495 B1 | 7/2001 | Rousseau | |
| 6,268,496 B1 | 7/2001 | Shaw | |
| 6,397,458 B1 | 6/2002 | Jones | |
| 6,398,847 B1 | 6/2002 | Jones | |
| 6,409,806 B1 | 6/2002 | Jones | |
| 6,562,112 B2 | 5/2003 | Jones | |
| 6,749,672 B2 * | 6/2004 | Lynn | A45D 20/12 34/96 |
| 6,814,909 B1 | 11/2004 | Sakurai | |
| 6,858,297 B1 | 2/2005 | Shah | |
| 6,979,361 B2 * | 12/2005 | Mihayiov | B01D 35/143 55/DIG. 34 |
| 7,695,660 B2 | 4/2010 | Berrigan | |
| 7,713,339 B2 | 5/2010 | Johansson | |
| 7,758,818 B2 | 7/2010 | Lee | |
| 7,858,163 B2 | 12/2010 | Angadjivand | |
| 7,947,142 B2 | 5/2011 | Fox | |
| 8,162,153 B2 | 4/2012 | Fox | |
| 8,225,782 B2 | 7/2012 | Rakow | |
| 8,365,723 B2 | 2/2013 | Poirier | |
| 8,574,343 B2 | 11/2013 | Bisson | |
| 2003/0134515 A1 | 7/2003 | David | |
| 2003/0182987 A1 | 10/2003 | Bodnar | |
| 2004/0011204 A1 | 1/2004 | Both | |
| 2007/0272081 A1 | 11/2007 | Johansson | |
| 2007/0277592 A1 | 12/2007 | Johansson | |
| 2009/0078121 A1 * | 3/2009 | Hepburn | A61L 9/16 96/222 |
| 2010/0024652 A1 | 2/2010 | Fox | |
| 2011/0185903 A1 | 8/2011 | Fox | |
| 2012/0017910 A1 | 1/2012 | Li | |
| 2013/0081446 A1 | 4/2013 | Yamasaki | |
| 2013/0101477 A1 | 4/2013 | Both | |
| 2014/0326134 A1 | 11/2014 | Frankel | |

FOREIGN PATENT DOCUMENTS

| | | |
|---|---|---|
| WO | WO 1988-01050 | 2/1988 |
| WO | WO 2014-149917 | 9/2014 |
| WO | WO 2015-094652 | 5/2015 |
| WO | WO 2015-103593 | 7/2015 |

* cited by examiner

AIR FILTER USE INDICATORS

TECHNICAL FIELD

The present disclosure relates generally to filters and more specifically to air filter use indicators. The present disclosure also relates to easy-to-use, low-cost air filter use indicators.

BACKGROUND

Air quality is a rising concern in many parts of the world. One air quality parameter of heightened interest is the level or amount of fine particulate matter. Air filters remove particulate contaminants from a moving gas stream, and specifically from air streams. Some exemplary contaminants include dust, lint, smoke, pollen, and/or dander. For instance, in conventional Heating, Ventilating, and Air Conditioning (HVAC) Systems, a filter is inserted into the air stream to remove contaminants from the air stream. The filtered air is then recirculated throughout the building.

Typically, in an HVAC system, an air filter is located next to the furnace or air conditioning system air handler (which typically contains a fan and fan motor). The air handler typically pulls air from the house or building through a "return" duct system and then blows the air through the heating or cooling system and back into the house or building through the duct system. The air filter is typically located at the point where the return duct enters the air handler.

Conventional air filters generally include filter media constructed from a porous material, such as open cell foam or a non-woven web of materials such as fiberglass, polypropylene, etc. As a stream of air is induced to flow through the air filter, particulate contaminants are entrapped or separated from the air stream and accumulate on the filter media. After a period of use in this manner, the accumulated contaminants begin to interfere with the flow of the air stream through the filter media. An increased pressure drop across the filter impedes air flow through the air filter and can potentially reduce the effectiveness of the entire HVAC system. To avoid this result, air filters be removed and either cleaned or replaced with a new air filter. However, typically the air filter is hidden from view during normal use, making it difficult to determine the condition of the filter media without removing the air filter from the HVAC system for visual inspection. Air filter removal can be challenging and can sometimes damage the air filter.

Devices have been provided that generate a change signal to alert a user to the clogged condition of the filter media and to indicate the need for inspection, cleaning, or replacement of the air filter. Such devices include simple pressure sensors that measure the pressure on the downstream side of the filter and generate a signal if the pressure drops below a predetermined point. In another example, U.S. Pat. No. 4,321,070, issued to Bede, provides a whistle mounted in the filter. When the filter becomes sufficiently clogged, the air stream is induced to flow through the whistle portion at an increasing rate until an audible signal is produced. U.S. Pat. No. 2,782,747, issued to Alderfer, U.S. Pat. No. 2,753,831, issued to Davies, and PCT Patent Application Serial No. 88/01050 to Horowitz, all also disclose audible change signal devices.

U.S. Pat. No. 2,804,839 discloses a device external to the filter that produces both an audible change signal and visual change signal responsive to an elevated differential pressure drop on either side of the filter. The visual signal is evident external of the filter and does not require removal of the filter itself and visual inspection. However, this device is complicated and expensive relative to the price of the air filter itself and thus does not lend itself to widespread use.

U.S. Pat. No. 3,027,865, issued to Kuntz et al. incorporates a diaphragm that shifts position responsive to a change in the pressure drop across an air filter. The shift in the position of the diaphragm may be used to provide a visual signal or to close an electrical contact in order to provide an electrical signal externally of the filter. U.S. Pat. No. 3,916,817 also discloses a device for providing a visual change signal.

None of these existing air filter change indicators are completely satisfactory. For instance, those that require an elaborate and complicated apparatus to provide a change signal are relatively expensive, and may require setup at installation and periodic maintenance to ensure reliable operation. Those devices that depend on a reduction in airflow to provide an audible signal may be susceptible to clogging by the very contaminants that the air filter is designed to entrap. It is also generally undesirable to require modification to the air circulation system or to the air filter, as is required by many of these approaches.

Moreover, all of these devices provide only one signal. That is, they only indicate when the air filter has reached a predetermined level of lowered performance. It may be desirable in certain situations to have a change indicator that provides a continuous and progressive indication of the performance of the filter.

SUMMARY

The inventors of the present disclosure recognized that it would be beneficial to have an air filter use indicator that indicates to an air filter user at least one of (1) the degree of use of the air filter; (2) the degree of contamination of the air filter; and/or (3) the air filter life (at least one of life used or life remaining). The air filter use indicators of the present disclosure are easy-to-use and/or low-cost. The air filter use indicators of the present disclosure can be used in an HVAC or air purifier system, including in one's home or office.

Some embodiments relate to an air filter use indicator, comprising a tab portion and an indicator portion including an indicator device capable of providing the user with information about whether the user should change their air filter. In some embodiments, at least a portion of the air filter use indicator can be removably placed adjacent to or within an HVAC or air purifier air stream.

In some embodiments, wherein the indicator portion includes a frame portion and at least one cutout portion and the at least one cutout portion has air filtration media within at least a portion of the cutout portion such air can flow through the air filtration media and/or cutout portion. In some embodiments, the air filter use indicator includes a chromatic filter life color scale that indicates the approximate degree of use of an air filter.

Some embodiments relate to an air filter use indicator comprising a device that can be removably placed upstream of an air filter in an HVAC or air purifier system. The device has a first major surface and a second major surface and permits air flowing through the HVAC or air purifier system to flow from portions of the first major surface to portions of the second major surface. The device includes air filtration media capable of capturing and accumulating contaminants in the air flowing through the HVAC or air purifier system.

Some embodiments of the present application relate to an air filter use indicator comprising a device that can be removably placed adjacent to an air filter. The device includes a frame portion and at least one cutout portion, the at least one cutout portion having air filtration media within at least a portion of the cutout portion such air can flow through at least a portion of the cutout portion. The air filtration media is capable of capturing and/or accumulating contaminants and/or particulates in the air flowing through the cutout portion.

In some embodiments, the frame portion consists of a single layer of material. In some embodiments, the frame portion includes a front portion and a back portion between which is the air filtration media. In some embodiments, the device includes two or more cutout portions. In some embodiments, the device is removably connected to or placed adjacent to one of the air filter and/or the HVAC or air purifier system. In some embodiments, the device removably couples to an edge of the air filter and/or the HVAC or air purifier system. In some embodiments, one of the air filter and/or an HVAC or air purifier system in which the device is used includes a mechanism into or through which the device can be inserted and/or from or through which the device can be withdrawn. In some embodiments, the device includes a tab portion that can be used to assist in removal of the device from a slotted hanger. In some embodiments, the device includes at least one of paper, polypropylene, polystyrene, and/or PET. In some embodiments, at least one of the device or the frame is a color that is the same or lighter than the unused air filtration media. In some embodiments, the device includes a chromatic filter life color scale that indicates the degree of use of the air filter. In some embodiments, at least 50% of the surface area of the device is air filtration media. In some embodiments, at least 70% of the surface area of the device is air filtration media. In some embodiments, the device includes the same air filtration media as the air filter. In some embodiments, the air filtration media includes electrostatic filtration media. In some embodiments, the air filtration media includes non-electrostatic media. In some embodiments, the device is placed upstream of the air filter. In some embodiments, the air filtration media includes a colored pigment. In some embodiments, at least one of the air filtration media and/or the frame are white or include a white pigment. In some embodiments, the device includes a tab portion and wherein the tab portion and the frame portion are made from a single piece of material. In some embodiments, the device is placed upstream of an HVAC or air purifier system.

Some embodiments of the present disclosure relate to a kit, comprising: an air filter for filtering particulate contaminants from an air stream; and the air filter use indicator as described above or herein.

BRIEF DESCRIPTION OF DRAWINGS

The present application may be more completely understood in consideration of the following detailed description of various embodiments of the disclosure in connection with the accompanying drawings. The following figures describe some exemplary constructions of various embodiments of the air filter use indicators described in the present disclosure. These figures describe some exemplary constructions and methods of using these various embodiments. The following figures are intended to be illustrative, but are not intended to limit the scope of the present disclosure.

DETAILED DESCRIPTION

Various embodiments and implementations will be described in detail. These embodiments and implementations should not be construed as limiting the scope of the present disclosure in any manner, and changes and modifications may be made without departing from the spirit and scope of the inventions described herein. For example, many of the embodiments, implementations, and examples are discussed with specific reference to air filters or air filter use indicators for use in HVAC systems or air purifiers, but these should not be construed to limit the scope of this disclosure to these exemplary implementations. For example, the air filters and air filter use indicators of the present disclosure could be used in, room air purifiers and/or car air filters. Further, only some end uses have been discussed herein, but end uses not specifically described herein are included within the scope of the present application. As such, the scope of the present application should be determined by the claims.

The present disclosure generally relates to air filter use indicators. In general, the air filter use indicators described herein comprise or include a device that can be quickly, easily, and removably placed within an air stream and that provides the user with information about whether the user should change their air filter. In some embodiments, the air filter use indicator correlates the useful remaining life of the in use air filter to an indicator or indication device or mechanism on the air filter use indicator. In some embodiments, the indicator or indication mechanism or device interacts with the air flowing over, around, or through the air filter use indicator (or a portion thereof) and creates an indication (visual or otherwise) of the air filter life. In some embodiments, the time interval over which alteration of the indicator or indication mechanism or device would correlate to or calibrate with the useful life of the air filter. In some embodiments, this correlation or calibration would be based on an estimated air volume flow through the HVAC or air purifier system or based on the particulate loading of the indicator, for example, to represent similar loading on the air filter.

In some embodiments, the air filter use indicator is removably placed adjacent to an air filter in, for example, an HVAC or air purifier system. In some embodiments, the air filter use indicator is placed upstream of the air filter. In some embodiments, the air filter use indicator is placed in a vent of the HVAC or air purifier. In some embodiments, the air filter use indicator has a first major surface and a second major surface, and air flowing through the air filter use indicator can flow from portions of the first major surface to portions of the second major surface of the air filter use indicator.

Figure 1:
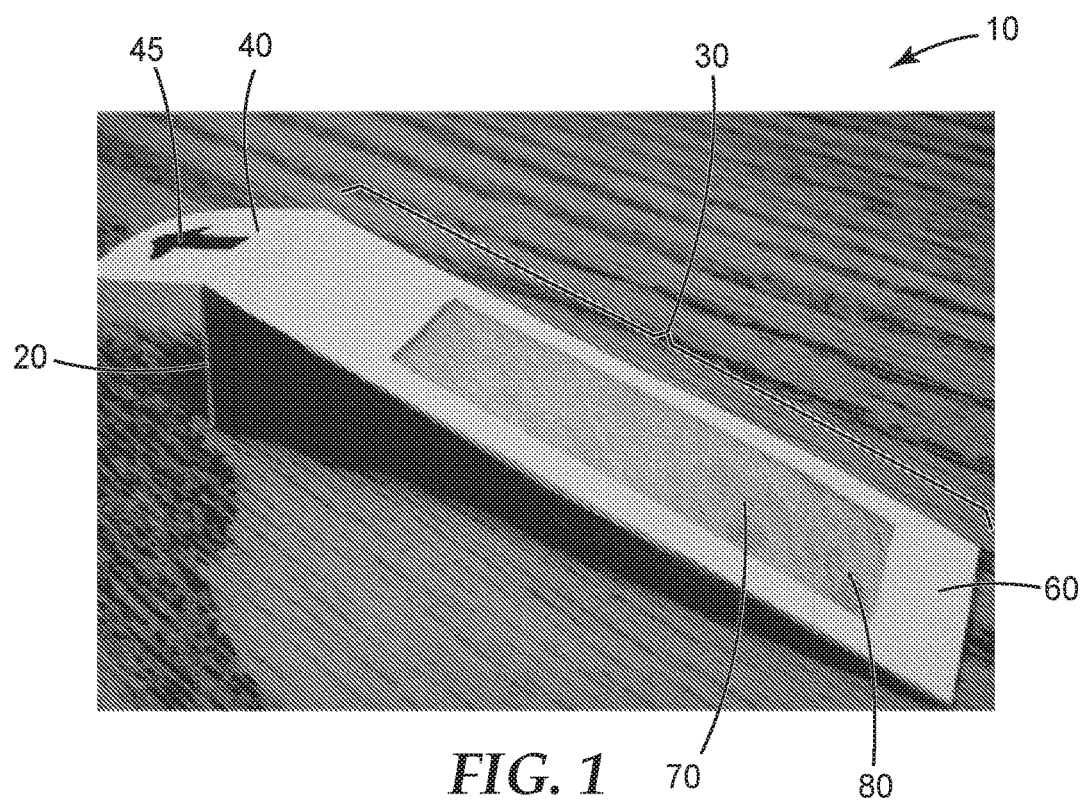
FIG. 1 is a photograph of an exemplary embodiment of an air filter use indicator consistent with the teachings herein.
Figure 2:
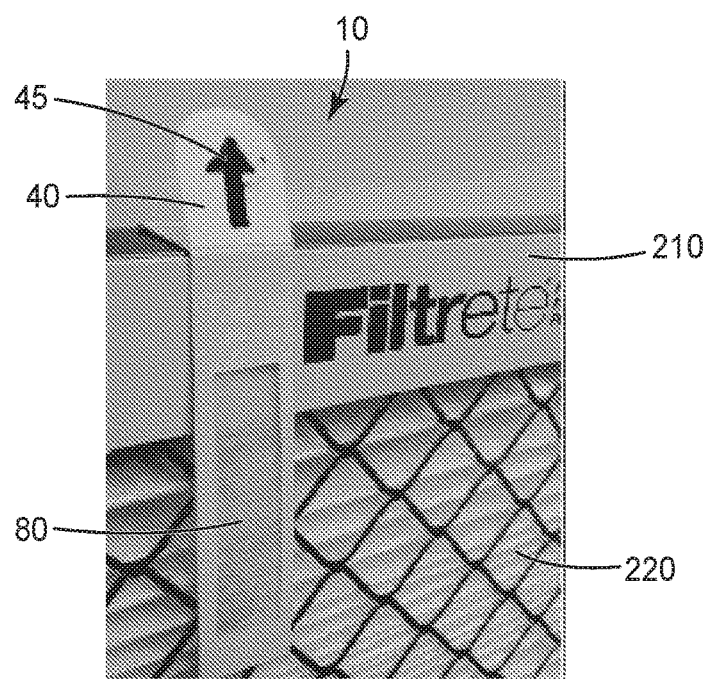
FIG. 2 is a photograph of the air filter use indicator of FIG. 1 in use.

Some embodiments of air filter use indicators described herein include an indicator or indication device or mechanism that correlates air filter life (either life used or life remaining) with information shown by the indicator. For example, some air filter use indicators of the present disclosure include filtration media capable of capturing and accumulating contaminants in the air flowing through the HVAC or air purifier system. As the media captures particulate matter, the color and/or pressure of the filtration media changes (typically changing from white or light to grey or darker). In other embodiments, air filter use indicators of the present disclosure include, for example, colorimetric, pH, gas exchange, evaporation, pressure change, and/or contaminant accumulation indicators. FIG. 1 is a schematic drawing of one exemplary air filter use indicator 10. FIG. 2 is a schematic drawing of one exemplary embodiment of the air filter use indicator of FIG. 1 in use. Air filter use indicator 10 of FIG. 1 includes a tab portion 20, an indicator portion 30, and a removal assistance portion 40.

Tab portion 20 rests on, is removably attached, affixed, or adjacent to either the air filter (shown in FIG. 2) or a portion of the HVAC or air purifier system. Tab portion 20 can be a tab (as shown in FIGS. 1 and 2) or can be any mechanism capable of permitting air filter use indicator 10 to rest on, to be removably attached to, to be removably affixed to, or to be adjacent to either the air filter (shown in FIG. 2) or a portion of the HVAC or air purifier system. As such, a tab is merely exemplary. Also, the specific implementation of a tab shown in FIG. 1 is merely exemplary. For example, the size, thickness, color, shape, etc. of the tab portion can be different than those shown in FIGS. 1 and 2 depending on, for example, the desired end use, air filter size, HVAC or air purifier system, etc. Tab portion 20 can be, for example, coated onto or affixed to one of indicator portion 30 or removal assistance portion 40 by, for example, an adhesive (e.g., repositionable adhesive) or a mechanical fastener.

In some embodiments, the tab portion can optionally include an affixation device that more securely adheres or attaches air filter use indicator 10 to the air filter or HVAC or air purifier system. Any affixation device may be used in addition to or in lieu of the tab shown in FIGS. 1 and 2. Some exemplary affixation devices include, for example, hook and loop fasteners, removable or temporary adhesives, Velcro™, mechanical snaps, clasps, etc.

Removal assistance portion 40 is shown in FIGS. 1 and 2 as a tab that projects upwardly from both tab portion 20 and indicator portion 30. Removal assistance portion 40 of FIGS. 1 and 2 permits a user to quickly and easily grasp removal assistance portion 40 and pull upward. This permits quick and easy removal of air filter use indicator 10. Once removed, the user can inspect (e.g. visually inspect) the air filter use indicator to determine the status of the air filter use. In some embodiments, removal assistance device 40 also assists the user to insert air filter use indicator 10 into the HVAC or air purifier system by providing an easy-to-grasp physical structure that is capable of mechanically moving the air filter use indicator into the desired physical space at a desired angle. Removal assistance portion 40 is optional. Removal assistance portion 40 can be any mechanism capable of assisting a user to insert and/or remove air filter use indicator 10 from a portion of the air filter and/or the HVAC or air purifier system. The tab implementation shown in FIGS. 1 and 2 is merely exemplary. Also, the specific implementation of a tab shown in FIGS. 1 and 2 is merely exemplary. For example, the size, thickness, color, shape, etc. of the tab portion can be different than those shown in FIGS. 1 and 2 depending on, for example, the desired end use, air filter size, HVAC or air purifier system, etc.

Some embodiments include an optional instruction portion 45 on or adjacent to removal assistance portion 40. Instruction portion 45 assists in informing a user how to remove and/or insert air filter use indicator 10 into the HVAC or air purifier system. The specific exemplary implementation shown in FIGS. 1 and 2 has an upward facing arrow directing a user to grasp the tab and pull upwardly to remove air filter use indicator 10 from the HVAC or air purifier system. Instruction portion 45 can be any communication means (e.g., alphanumerics, symbols, designs, shapes, etc.) capable of assisting a user to insert and/or remove air filter use indicator 10 from the air filter and/or the HVAC or air purifier system. The arrow implementation shown in FIGS. 1 and 2 is merely exemplary. Also, the specific implementation of an arrow shown in FIGS. 1 and 2 is merely exemplary.

Indicator portion 30 of FIGS. 1 and 2 includes a frame portion 60 and a cutout 70. In some embodiments, air filtration media 80 is within cutout 70. Frame portion 60 and cutout 70 together form a window. Air from the air stream flows through the window, and thus through or by air filtration media 80, which is within the window. In other embodiments, an alternative filter use indicator mechanism is in, on, adjacent to, or integral with frame portion or indicator portion. For example, a colorimetric indicator could be attached or adjacent to frame portion 60.

Frame portion 60 can be of any desired shape or size and can include any desired number of layers. For example, in some embodiments, frame portion 60 includes a first piece and a second piece between which is positioned, adhered, attached, and/or affixed, air filtration media 80. Such embodiments can also be described as having a front surface and a back surface each having at least one cutout 70 and air filtration media 80 between the front and back surfaces such that the air filtration media 80 is present in the area of the cutout 70. In some embodiments, frame portion 60 includes only a first piece to which is adhered, attached, and/or affixed air filtration media 80. Such embodiments can also be described as having a front surface having at least one cutout 70 and an air filtration media 80 adjacent to the front surface such that the air filtration media 80 is present in the area of the cutout 70. Frame portion 60 can form any desired percentage of the total area of indicator portion 30. In some embodiments, frame portion 60 comprises less than 50% of the total area of indicator portion 30. In some embodiments, frame portion 60 comprises less than 40% of the total area of indicator portion 30. In some embodiments, frame portion 60 comprises less than 30% of the total area of indicator portion 30. In some embodiments, frame portion 60 comprises less than 20% of the total area of indicator portion 30. In some embodiments, frame portion 60 comprises less than 10% of the total area of indicator portion 30. In some embodiments, frame portion 60 is white or a light color, which assists in providing contrast between the "dirty" air filtration media and the frame.

Cutout(s) 70 can be of any desired shape or size. Cutout(s) 70 form an air bypass window permitting air flow through indicator portion 30. Indicator portion 30 can include a single cutout 70 or multiple cutouts 70. In some embodiments, indicator portion includes one cutout. In some embodiments, indicator portion 30 includes two cutouts. In some embodiments, indicator portion includes three cutouts. In some embodiments, indicator portion includes more than three cutouts.

Cutout 70 (whether single or multiple) can form any desired percentage of the total area of indicator portion 30. In some embodiments, cutout 70 (whether single or multiple) comprises at least 50% of the total area of indicator portion 30. In some embodiments, cutout 70 (whether single or multiple) comprises at least 60% of the total area of indicator portion 30. In some embodiments, cutout 70 (whether single or multiple) comprises at least 70% of the total area of indicator portion 30. In some embodiments, cutout 70 (whether single or multiple) comprises at least 80% of the total area of indicator portion 30. In some embodiments, cutout 70 (whether single or multiple) comprises at least 90% of the total area of indicator portion 30.

Any desired air filtration media 80 can be used. In some embodiments, air filtration media 80 is the same air filtration media that is in the adjacent air filter. In some embodiments, air filtration media 80 is different than the air filtration media that is in the adjacent air filter. In some embodiments, air filtration media 80 is electrostatic. In some embodiments, air filtration media 80 is not electrostatic. In some embodiments, there is a single layer of air filtration media 80. In some embodiments, there are multiple layers of air filtration media 80. In some embodiments, air filtration media 80 is flat. In some embodiments, air filtration media 80 is pleated or curved.

In some embodiments, air filtration media 80 is attached from the backside (i.e., filter-facing side) of the indicator portion 30. Air filtration media 80 can be attached to indicator portion 30 in any desired way including, for example, using an adhesive, using thermal processing, using mechanical fixation means, etc.

In some embodiments, air filtration media 80 is within or adjacent to at least a portion of cutout(s) 70. In some embodiments, air filtration media 80 occupies at least 50% of the total area of cutout(s) 70. In some embodiments, air filtration media 80 occupies at least 60% of the total area of cutout(s) 70. In some embodiments, air filtration media 80 occupies at least 70% of the total area of cutout(s) 70. In some embodiments, air filtration media 80 occupies at least 80% of the total area of cutout(s) 70. In some embodiments, air filtration media 80 occupies at least 90% of the total area of cutout(s) 70. In some embodiments, air filtration media 80 occupies 100% of the total area of cutout(s) 70.

When in use, some embodiments of air filter indicator 10 hang off the side of either the air filter 210 (shown in FIG. 20) or a portion of the HVAC or air purifier system (not shown).

In some embodiments, air filter indicator 10 is adjacent to an air filter. In some such embodiments, including, for example, the embodiment shown in FIG. 2, at least a portion of cutout(s) 70 and/or air filtration media 80 of air filter use indicator 10 hangs over or is adjacent to the air filtration media portion 220 of air filter 210. When in operation, air that would be incident on the air filtration media 220 of air filter 210 is instead or first incident on air filtration media 80 or cutout 70 of air filter use indicator 10. As such, air filter use indicator 10 will filter out or remove contaminants in the air stream. Over time, these contaminants will change the color (or another indicator such as, for example, pH, electrostatic charge, etc.) of the air filtration media 80 in cutout(s) 70 of air filter use indicator 10.

Figure 13:
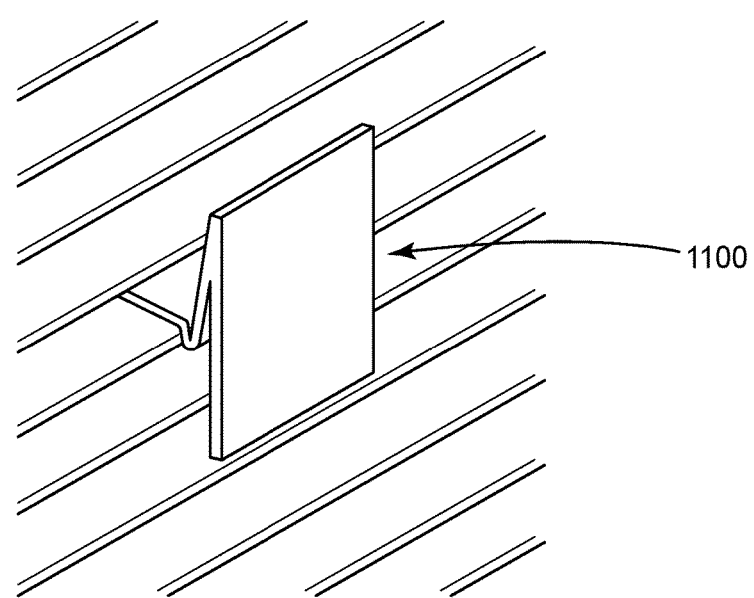
FIG. 13 is a photograph of the air filter use indicator of either FIG. 11 or 12 in use.

In some embodiments, the air filter indicator is positioned anywhere in the HVAC or air purifier system or air stream. For example, the air filter indicator can be positioned in, on, or adjacent to a vent (as is shown in FIG. 13).

In some embodiments, an air filter user can quickly and visually detect the degree of contamination or use of air filter use indicator 10, which serves as a proxy or otherwise indicates the degree of use of the air filtration media 220 in air filter 210. In some embodiments, the user will use or reference a secondary device (e.g., electrostatic meter, pH color change chart, etc.) to determine the degree of use of air filtration media 80 or 220. Because the air filter use indicator is smaller in size than the filter and is easier to remove and assess, users are able to quickly and easily obtain valuable information on the degree or use or contamination of their air filter by assessing the degree or use or contamination of the filter media in the air filter indicator. This assists a user in quickly determining whether air filter replacement is needed.

Dirty air filters can restrict the air flow and/or pressure in an HVAC air handler. Restricted air flow places additional strain on the air handler fan motor. Left unchecked, this could result in motor burnout and system overheating, which would ultimately result in the entire HVAC system becoming unoperational. Additionally, a dirty air filter makes the fan motor work harder, thus causing it to use more electricity and increase the owner's/user's monthly energy bills. A dirty air filter can also reduce the air quality in a home or building. Poor home or building air quality can aggravate allergies and asthma, especially in children. A dirty air filter can cause the heating and air conditioning systems themselves—and the ducts—get dirty faster. This can lead to costly cleaning expenses or a need to replace these units sooner than would otherwise be required. Lastly, a dirty air filter increases one's carbon footprint. Regular filter replacement eliminates or significantly reduces all of these risks. The air filter use indicator of the present disclosure assists HVAC and/or air purifier owners and users in determining when a filter should be replaced so that all of these risks can be mitigated and so that one's carbon footprint can be minimized. In some ways and/or embodiments, the air filter use indicator of the present disclosure can act as a dipstick that provides information to the user on contamination level of the air filter. In some embodiments, the air filter use indicator is a closely positioned, similar material-containing proxy.

Figure 3:
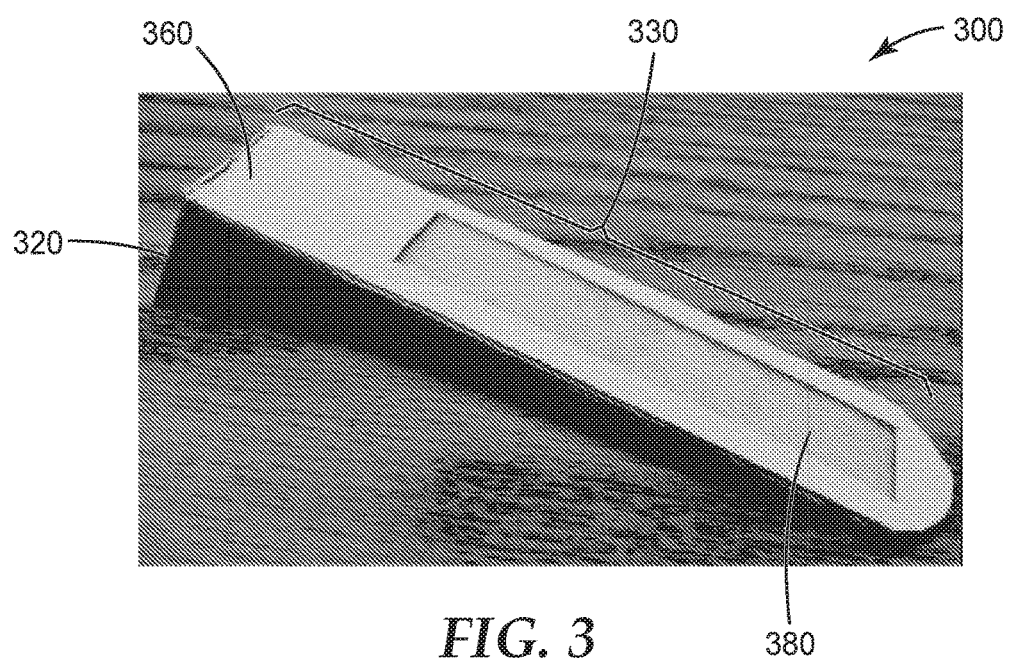
FIG. 3 is a photograph of an exemplary embodiment of an air filter use indicator consistent with the teachings herein.
Figure 4:
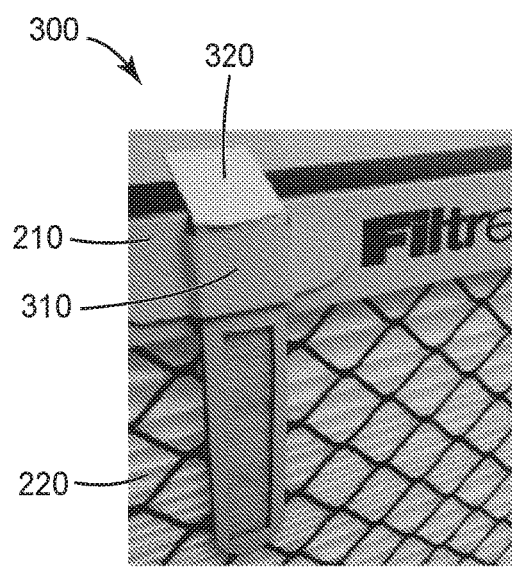
FIG. 4 is a photograph of the air filter use indicator of FIG. 3 in use.
Figure 5:
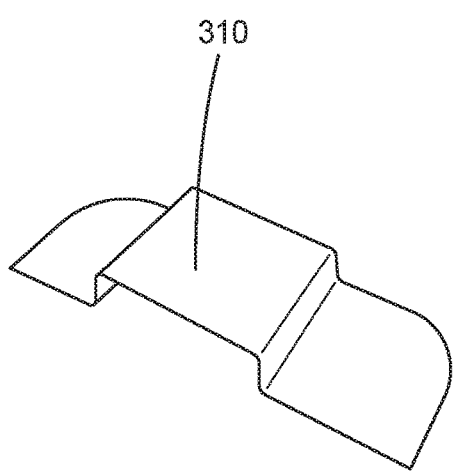
FIG. 5 is a photograph of a slotted hanger for use with the air filter use indicator of FIG. 3.

FIG. 3 is a schematic drawing of one exemplary air filter use indicator 300. FIG. 4 is a schematic drawing of one exemplary embodiment of the air filter use indicator of FIG. 3 when in use. FIG. 5 is an enlarged schematic drawing of a slotted hanger 310 for use with, for example, the air filter use indicator 300 of FIG. 3.

Air filter use indicator 300 of FIG. 3 is substantially the same as the air filter use indicator 10 of FIG. 1 except that air filter use indicator 300 of FIG. 3 does not include a separate removal assistance portion or a tab portion. Also, air filter use indicator 300 is held adjacent to the air filter or HVAC or air purifier system by means of a mechanical attachment mechanism. In the specific embodiment shown in FIG. 3, the attachment mechanism is on the air filter. However, the attachment mechanism can be in any portion of the air purifier or HVAC system. The exemplary mechanical attachment mechanism shown in FIGS. 3, 4, and 5 is a slotted hanger 310 into which air filter use indicator 300 can be slid and held in place. The exemplary embodiment(s) in FIGS. 3-5 includes a tab portion 320 that has a bend of approximately 70-80° from the indicator portion 330. This degree of bend acts as a stop permitting the air filter use indicator to hang off the air filter. Also, this degree of bend permits tab portion 320 to act as a removal assistance portion because it provides an easy mechanism for the user to quickly grab and pull to remove the air filter use indicator from the HVAC or air purifier system. In some embodiments, the degree of bend is greater than 30°. In some embodiments, the degree of bend is greater than 40°. In some embodiments, the degree of bend is greater than 50°. In some embodiments, the degree of bend is between 50° and 90°. In some embodiments, the degree of bend is less than 90°. In some embodiments, the degree of bend is less than 80°.

Air filter use indicator 300 of FIGS. 3, 4, and 5 includes a tab portion 320 and an indicator portion 330. Tab portion 320 can fulfill the roles of both or either of the tab portion 20 described above or the removal assistance portion 40 described above. In some embodiments, tab portion 320 rests on, is removably attached, affixed, or adjacent to either the air filter (shown in FIG. 4) or a portion of the HVAC or air purifier system (not shown). In some embodiments, tab portion 320 sticks up slightly from the air filter or a portion of the HVAC or air purifier system, permitting the user to easily grab the tab and use it to remove the air filter use indicator 300 from the slotted hanger 310. In some embodiments, tab portion 320 is flat or generally flat or flush with the air filter or a portion of the HVAC or air purifier system.

Tab portion 320 can be a tab (as shown in FIGS. 3 and 4) or can be any mechanism capable of permitting air filter use indicator 10 to rest on, to be removably attached to, to be removably affixed to, or to be adjacent to either the air filter (shown in FIG. 4) or a portion of the HVAC or air purifier system. As such, a tab is merely exemplary. Also, the specific implementation of a tab shown in FIGS. 3 and 4 is merely exemplary. For example, the size, thickness, color, shape, etc. of tab portion 320 can be different than those shown in FIGS. 3 and 4, depending on, for example, the desired end use, air filter size, HVAC or air purifier system, etc. Tab portion 320 can be, for example, coated onto or affixed to one of indicator portion 330 by, for example, an adhesive (e.g., repositionable adhesive) or a mechanical fastener. Tab portion 320 can also include an optional instruction portion of the type generally described herein that assists in informing a user how to remove or insert air filter use indicator 300 into an air filter, HVAC, or air purifier system.

Indicator portion 330 is of the same general type as described above and herein. All of the statements about indicator portions made herein apply equally to the indicator portion of FIGS. 3-5. The indicator portion shown in FIGS. 6-7 includes a frame portion 360 and a cutout 370 in which is located air filtration media 380.

Those of skill in the art will appreciate that any of the specific sizes, shapes, angles, etc. shown in the exemplary embodiments shown in FIGS. 3-5 are merely exemplary and could be changed based on the desired end use.

Figure 6:
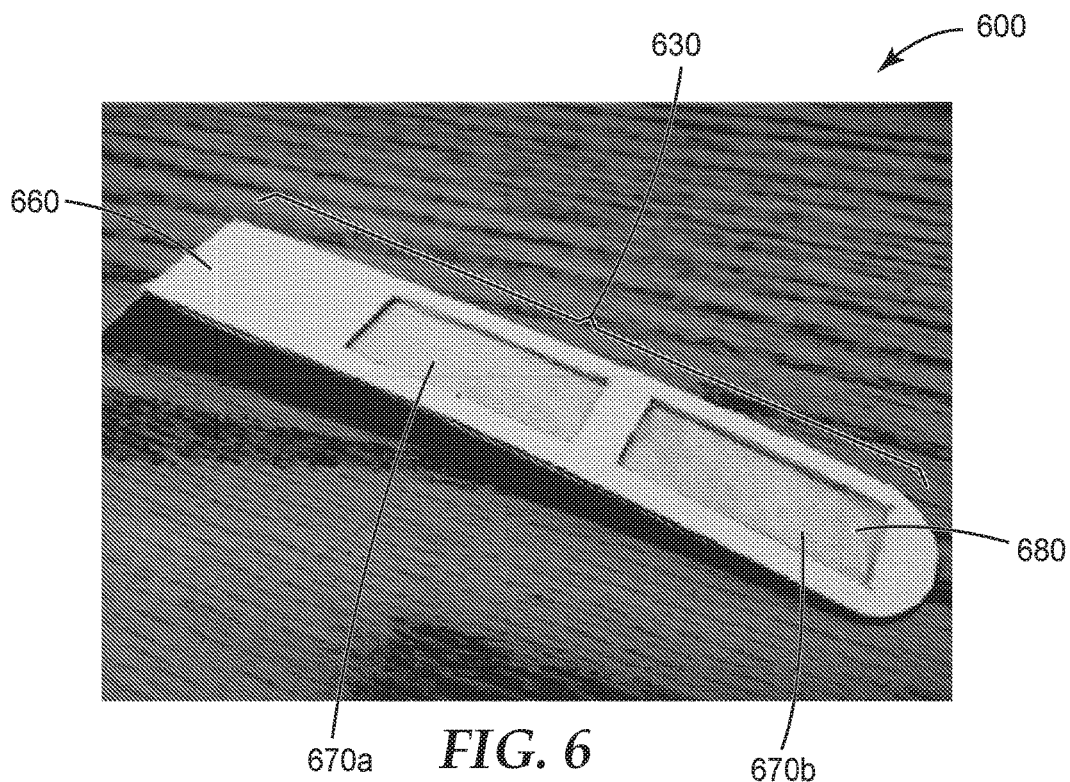
FIG. 6 is a photograph of an exemplary embodiment of an air filter use indicator consistent with the teachings herein.
Figure 7:
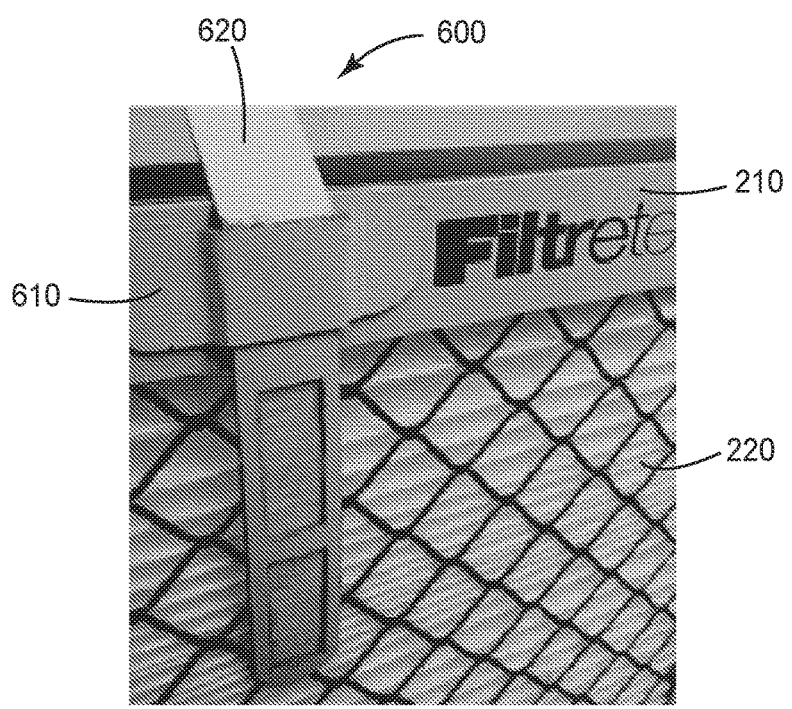
FIG. 7 is a photograph of the air filter use indicator of FIG. 6 in use.

FIG. 6 is a schematic drawing of one exemplary air filter use indicator 600. FIG. 7 is a schematic drawing of one exemplary embodiment of the air filter use indicator of FIG. 6 in use. Air filter use indicator 600 of FIGS. 6 and 7 is substantially the same as the air filter use indicator of FIGS. 3-5 except that the air filter use indicator 600 of FIGS. 6 and 7 includes two cutouts 670a and 670b. Air filtration media 680 is present in both cutouts. In some embodiments, the air filtration media in the cutouts is the same. In some embodiments, the air filtration media in the cutouts differs. In some embodiments, the air filtration media in one cutout is electrostatically charged, and the air filtration media in the second cutout is not electrostatically charged. The air filtration media that is not electrostatically charged will collect a fraction (smaller amount) of the particulate/contaminant matter collected by the electrostatically charged air filtration media. The differential particulate/contaminant presence on the two adjacent cutouts provides an excellent visual indication of how much particulate/contaminant the filter has collected compared to a relatively clean (uncharged) filter.

Any of the embodiments or implementation described herein can include one or more tab portions, one or more indicator portions, and/or one or more removal assistance portions made of or including any material that permits these portions to effect the goals described herein. For example, tab portion, indicator portion, and/or removal assistance portion can be made of or include any one or more of the following exemplary materials: paper (e.g., cardstock, cardboard), plastic, rubber, polypropylene, polystyrene, and/or PET.

Figure 8:
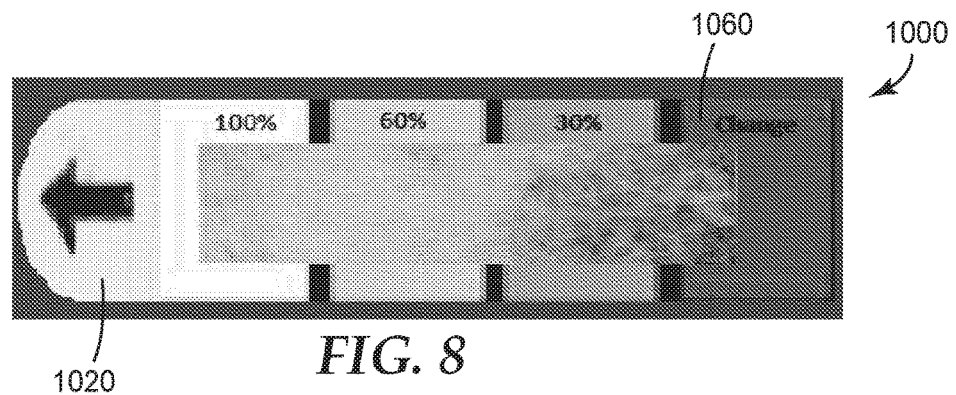
FIG. 8 is a photograph of an exemplary embodiment of an air filter use indicator consistent with the teachings herein.
Figure 9:
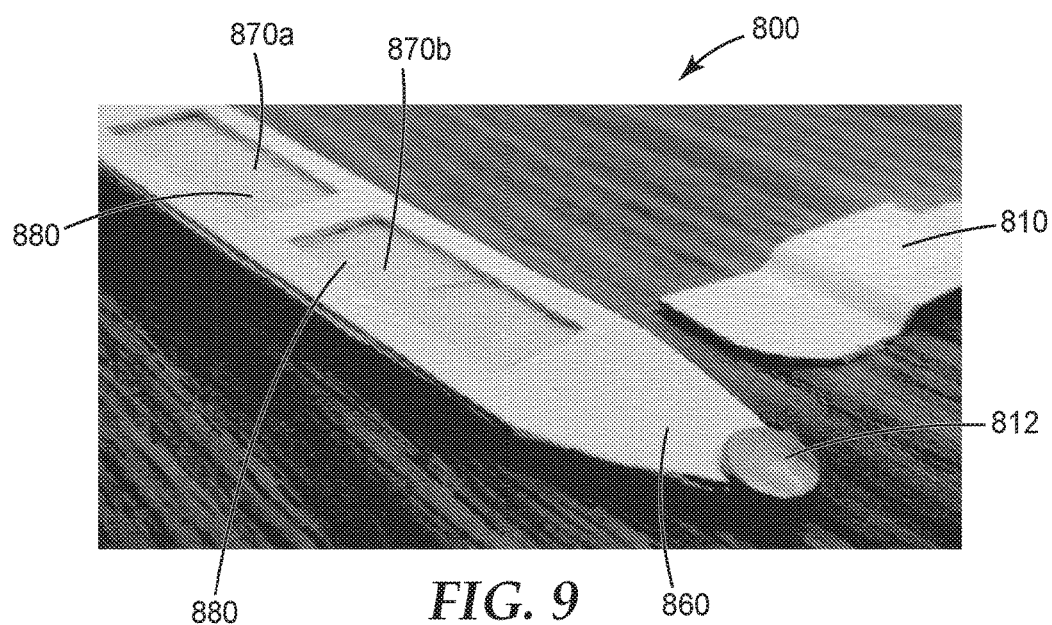
FIG. 9 is a photograph of the air filter use indicator of FIG. 8 in use.

FIG. 8 is a schematic drawing of an exemplary air filter use indicator 800. FIG. 9 is a schematic drawing of the air filter use indicator of FIG. 8 in use. Air filter use indicator 800 of FIGS. 8 and 9 is substantially the same as the air filter use indicator of FIGS. 6 and 7 except that the air filter use indicator 800 includes a stop portion 812. Stop portion 812 prevents air filter use indicator 800 from being fully removed but permits a user to withdraw air filter use indicator 800 to view the air filtration media contamination or use as measured or indicated by the air filter use indicator 800. Stop portion 812 of FIGS. 8 and 9 prevents the air filter use indicator 800 from being fully retracted or removed from hanger 810. In some embodiments, stop portion 812 prevents the air filter use indicator 800 from sliding past the stop portion 812. In some embodiments, stop portion 812 assists in holding air filter use indicator 800 in a desired location relative to air filter 210 and/or a portion of an HVAC or air purifier system. Additionally, or alternatively, in some embodiments, stop portion 812 permits air filter use indicator 800 to act as an air filter removal tool (in addition to providing air filter use information to a user). Specifically because stop portion 812 can hold air filter use indicator 800 in a position that extends above the topmost edge of the air filter, air filter use indicator 800 can quickly and easily be pulled or manipulated or maneuvered by the user. Because stop portion 812 connects air filter use indicator 800 to the air filter, such manipulation of the air filter use indicator will result in the air filter use indicator being quickly and easily extracted or removed from the air filter or HVAC or air purifier system.

In some embodiments, stop portion 812 holds the air filter use indicator 800 in a position such that the cutouts 870a and 870b and filtration media 880 do not physically overlap the air filtration media 820 of the air filter. In this position, the user can visually inspect air filter use indicator 812 without risk of dropping or losing it. In the exemplary embodiment show in FIGS. 8 and 9, air filter use indicator 800 is held in a position extending above the top surface of air filter 210. However, stop portion 812 can hold air filter use indicator 800 in any desired position.

Stop portion 812 of FIGS. 8 and 9 is shown as a mechanical pin that is inserted into a portion of the frame 860 of air filter use indicator 800. However, any known device can be used to act as stop portion 812, including, for example, a raised bump, a ridge, a hook, hook and loop, repositionable adhesive, etc.

Figure 10:
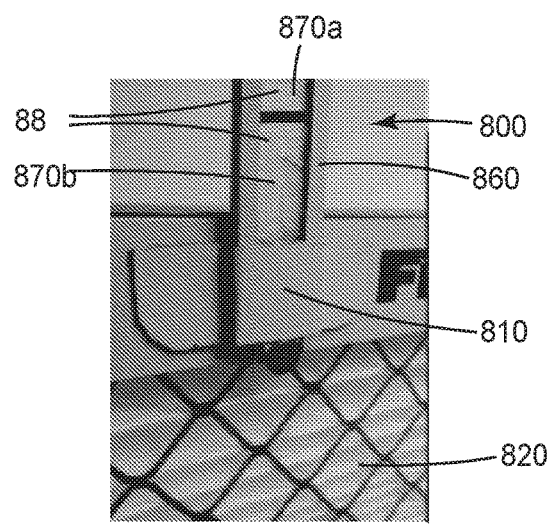
FIG. 10 is a photograph of an exemplary embodiment of an air filter use indicator consistent with the teachings herein.

In some embodiments, a portion of the air filter use indicator (including, for example, any of the embodiments shown or described herein) includes a chromatic filter life representative color scale to indicate the use (or remaining life) of the air filter. One exemplary implementation of such an embodiment is shown, for example, in FIG. 10. The implementation of FIG. 10 includes a chromatic filter life representative color scale printed on the frame portion 1060 of air filter use indicator 1000. The exemplary chromatic filter life representative color scale shown in FIG. 10 provides percentage of life remaining on the air filter. At the far left of the color scale is "100%" which indicates that the air filter has 100% of its useful life remaining and thus has little to no contamination. This portion of the color scale is relatively white or light. At the opposite end of the color scale (the far right-hand side) is "Change" which indicates that the filter has reached the end of its useful life and is no longer effectively removing particulates or contaminants from the air flow. As such, the air filter is ready to be changed. This portion of the color scale is relatively black or dark. Various gradations exist between these two ends of the spectrum. The exemplary implementation shown in FIG. 10 includes 60% and 30% gradations. Any desired gradation or filter life indicator scale can be used. For example, in embodiments where the filter life indicator includes pH information, the scale can be pH or color. In embodiments where the filter life indicator includes electrostatic charge, the scale can measure charge. In embodiments where the filter life indicator includes color, the scale can measure color or color changes.

Figure 11:
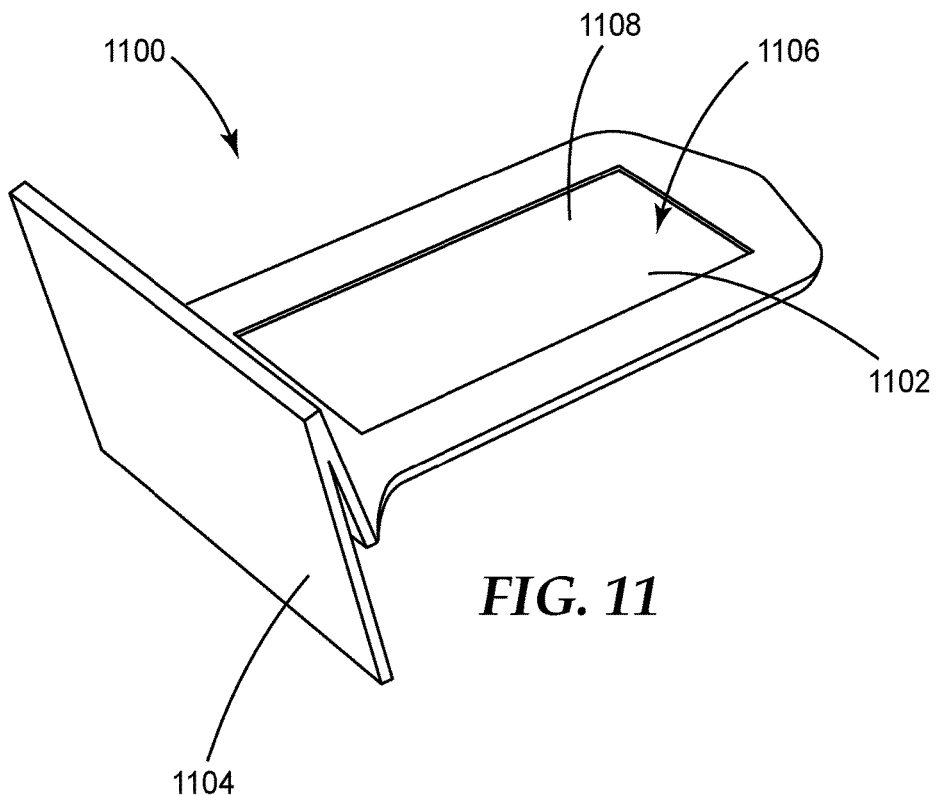
FIG. 11 is a photograph of an exemplary embodiment of an air filter use indicator consistent with the teachings herein.

FIG. 11 is a photograph of an exemplary embodiment of an air filter use indicator 1100. Air filter use indicator 1100 is a generally t-shaped structure including an indicator portion 1102 and a tab portion 1104. Tab portion 1104 is generally perpendicular to indicator portion. In other words, tab portion is at an angle to indicator portion and that angle is between about 70 degrees and about 110 degrees. In some embodiments, the angle is between 75 degrees and 105 degrees. In some embodiments, the angle is between 80 degrees and 100 degrees. In some embodiments, the angle is between 85 degrees and 95 degrees. In some embodiments, the angle is between 87 degrees and 93 degrees. Indicator portion 1102 can be inserted into the air stream of an air purifier or HVAC system. For example, indicator portion 1102 of air filter use indicator 1100 can be inserted into a vent portion of an HVAC or air filter system, as is shown in FIG. 13.

Indicator portion 1102 of the embodiment shown in FIG. 11 includes a cutout 1106 into which is placed, adhered, or affixed filtration media 1108. Cutout(s) 1106 can be in any desired shape or number or size. Indicator portion 1102 can include a frame that is any desired shape or size.

Figure 12:
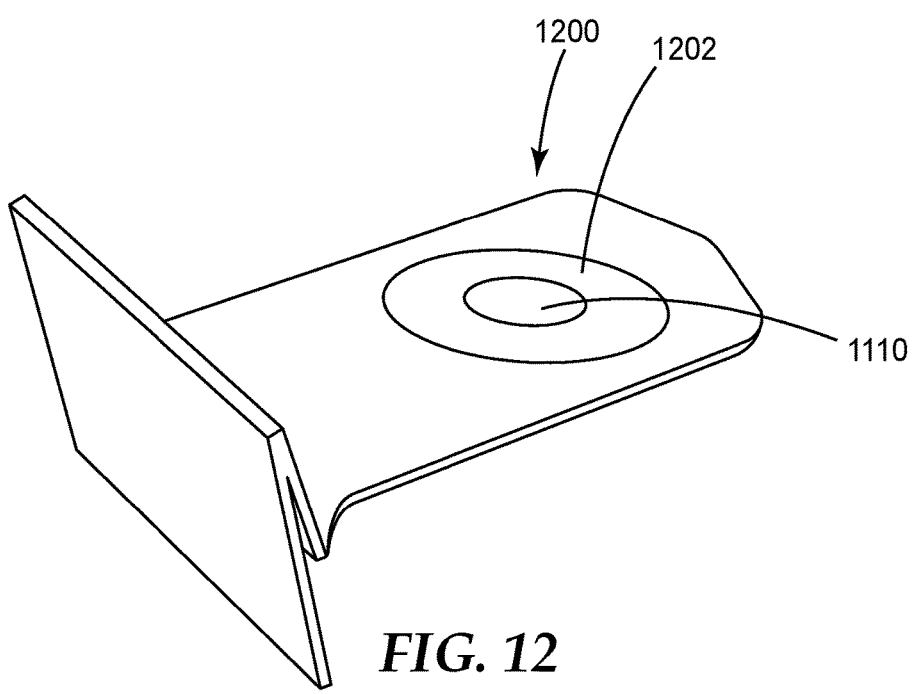
FIG. 12 is a photograph of an exemplary embodiment of an air filter use indicator consistent with the teachings herein.

FIG. 12 is a photograph of an exemplary embodiment of an air filter use indicator 1200. Air filter use indicator 1200 is substantially the same as the air filter use indicator 1100 shown in FIG. 11 except that it includes a colorimetric indicator 1110 adhered, affixed, or adjacent to the indicator portion 1202 instead of a cutout and filtration media. As air flows over or is incident on the colorimetric indicator 1110, the color of a portion of the colorimetric indicator 1110 (e.g. the outer circle) will shift or change over time. In some embodiments, the color of the outer circle will shift over time to match the color of the inner circle, indicating that the air filter needs to be changed.

FIG. 13 is a photograph of the air filter use indicator of either FIG. 11 or 12 in use. The indicator portion of the air filter use indicator can be inserted into a vent portion of an HVAC or air filter system. In some embodiments, the air filter use indicator is inserted into a cold air return vent or an air supply vent in, for example, and HVAC system. Air flows over, around, or through the air filter use indicator.

A user can quickly and easily hold or grab onto the tab portion and extract the air filter use indicator from the vent. The user can then quickly look at the indicator portion of the air filter use indicator and determine whether an air filter change is desired or needed.

The use indicators or use indicating devices or portions of any of the air filter use indicators described herein can be any known air filter use indicator or indicator mechanism. This includes, for example, devices or portion that detect color change, pH change, gas exchange, evaporation, pressure change, contaminant accumulation, etc. Exemplary color change indicators include those described in PCT Patent Application No. WO/2015/103593 (entitled COLORIMETRIC INDICATOR RESPONSIVE TO AIR FLOW), incorporated herein in its entirety. In some embodiments, the colorimetric device can be a coating that interacts with the air passing through it by the colorimetric device or indicator.

The recitation of all numerical ranges by endpoint is meant to include all numbers subsumed within the range (i.e., the range 1 to 10 includes, for example, 1, 1.5, 3.33, and 10).

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims.

What is claimed is:

1. An air filter use indicator, comprising:
a tab portion; and
an indicator portion including an indicator device capable of providing the user with information about whether the user should change their air filter;
wherein the indicator portion of the air filter use indicator can be removably placed adjacent to and upstream of an air filter within an HVAC or air purifier system
and wherein the tab portion is configured with a bend of greater than 50 degrees from the indicator portion and is configured so that when the indicator portion is placed adjacent to and upstream of the air filter, at least a part of the tab portion extends past an upper sidewall of a frame of the air filter.

2. The air filter use indicator of claim 1, wherein the indicator portion includes a frame portion and at least one cutout portion, the at least one cutout portion having air filtration media within at least a portion of the cutout portion such air can flow through the air filtration media and/or cutout portion;
   wherein the air filtration media is capable of capturing and/or accumulating contaminants and/or particulates in the air flowing through the cutout portion.

3. The air filter use indicator of claim 1, wherein the indicator portion includes a frame portion that consists of a single layer of material.

4. The air filter use indicator of claim 2, wherein the indicator portion includes a frame portion that includes a front portion and a back portion between which is positioned the air filtration media.

5. The air filter use indicator of claim 2, including two or more cutout portions.

6. The air filter use indicator of claim 1, wherein the air filter use indicator removably couples to an edge of the air filter.

7. The air filter use indicator of claim 1, wherein one of the air filter and/or an HVAC or air purifier system includes a mechanism into or through which the air filter use indicator can be inserted and/or from or through which the device can be withdrawn.

8. The air filter use indicator of claim 1, wherein the tab portion can be used to assist in removal of the air filter use indicator from a slotted hanger.

9. The air filter use indicator of claim 1, wherein the tab portion and/or indicator portion includes at least one of paper, polypropylene, polystyrene, and/or PET.

10. The air filter use indicator of claim 2, wherein at least a portion of a frame portion or indicator portion is a color that is the same or lighter than unused air filtration media.

11. The air filter use indicator of claim 1, wherein the air filter use indicator includes a chromatic filter life color scale that indicates the approximate degree of use of an air filter.

12. The air filter use indicator of claim 2, wherein at least 50% of the surface area of a major surface of the air filter use indicator includes air filtration media.

13. The air filter use indicator of claim 2, wherein at least 70% of the surface area of a major surface of the air filter use indicator includes air filtration media.

14. The air filter use indicator of claim 2, wherein the air filter use indicator includes the same air filtration media as the air filter.

15. The air filter use indicator of claim 2, wherein the air filtration media includes electrostatic filtration media.

16. The air filter use indicator of claim 2, wherein the air filtration media includes non-electrostatic media.

17. The air filter use indicator of claim 1, wherein the air filter use indicator further comprises a removal assistance portion that is configured so that when the indicator portion is positioned adjacent to and upstream of the air filter, at least a part of the removal assistance portion extends past an upper sidewall of a frame of the air filter so that a user can grasp the removal assistance portion to remove the air filter use indicator from the air filter.

18. The air filter use indicator of claim 2, wherein the air filtration media includes a colored pigment.

19. The air filter use indicator of claim 2, wherein at least one of the air filtration media and/or the frame portion are white or include a white pigment.

20. The air filter use indicator of claim 2, wherein the tab portion and the frame portion are made from a single piece of material.

21. The air filter use indicator of claim 1, wherein the indicator portion includes an indicator that is at least one of a colorimetric, pH, gas exchange, evaporation, pressure change, and/or contaminant accumulation indicator.

* * * * *